(12) United States Patent
Yang et al.

(10) Patent No.: US 10,941,293 B2
(45) Date of Patent: Mar. 9, 2021

(54) POLYMER COMPOSITION BASED ON LINEAR ALIPHATIC POLYAMIDE

(71) Applicants: Evonik Operations GmbH, Essen (DE); Evonik Specialty Chemicals (Shanghai) Co., Ltd., Shanghai (CN)

(72) Inventors: Jianmin Yang, Shanghai (CN); Urs Welz-Biermann, Lafayette, IN (US); Klaus Hülsmann, Haltern am See (DE); Fei Teng, Shanghai (CN); Juan Guo, Shanghai (CN); Chenyu Ye, Shanghai (CN); Zhisheng Wang, Shanghai (CN); Kathrin Salwiczek, Recklinghausen (DE)

(73) Assignees: Evonik Operations GmbH, Essen (DE); Evonik Specialty Chemicals (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/733,077

(22) PCT Filed: Nov. 14, 2017

(86) PCT No.: PCT/CN2017/110835
§ 371 (c)(1),
(2) Date: May 12, 2020

(87) PCT Pub. No.: WO2019/095099
PCT Pub. Date: May 23, 2019

(65) Prior Publication Data
US 2020/0299508 A1    Sep. 24, 2020

(51) Int. Cl.
*C08L 77/06*    (2006.01)

(52) U.S. Cl.
CPC .................................. *C08L 77/06* (2013.01)

(58) Field of Classification Search
CPC ....................................................... C08L 77/06
See application file for complete search history.

(56) References Cited

U.S. PATENT DOCUMENTS

| 2012/0177858 A1 | 7/2012 | Topoulos |
| 2014/0066561 A1 | 3/2014 | Pfleghar et al. |

FOREIGN PATENT DOCUMENTS

| WO | 2008/066763 | 6/2008 |

OTHER PUBLICATIONS

International Search Report dated Jun. 8, 2018 in PCT/CN2017/110835.
Written Opinion dated Jun. 8, 2018 in PCT/CN2017/110835.

*Primary Examiner* — Arrie L Reuther
(74) *Attorney, Agent, or Firm* — Grüneberg and Myers PLLC

(57) ABSTRACT

A polymer composition includes a linear aliphatic polyamide having on average 10 to 14 carbon atoms in the monomer units, an S glass fibre, and a polyolefinic impact modifier. The polymer composition can achieve higher stiffness and impact strength without impairing the ductility. The polymer composition can be used as a moulding material.

15 Claims, No Drawings

POLYMER COMPOSITION BASED ON LINEAR ALIPHATIC POLYAMIDE

CROSS-REFERENCE TO RELATED APPLICATIONS

This application is a National Stage entry under § 371 of International Application No. PCT/CN2017/110835, filed on Nov. 14, 2017, the content of which is hereby incorporated by reference in its entirety.

FIELD OF THE INVENTION

The present invention relates to the field of polymer compositions. In particular the present invention relates to a polymer composition comprising a linear aliphatic polyamide, an S glass fibre and a polyolefinic impact modifier.

BACKGROUND

Linear aliphatic polyamides, e.g. those based on PA12, can be used to make sports shoe outsoles and due to its transparency, the design pattern and colour of the midsole can be seen through the polymer outsole by human eyes.

For this application, it is sometimes desired to have higher stiffness and higher impact strength. For such a reason, glass fibres and impact modifiers are normally added to modify the polyamide. However, the ductility of the polyamide will normally be impaired, which increases the failure risk of injection parts during usage.

US2014066561 discloses polyamide moulding compounds consisting of thermoplastic synthetic, fibre-shaped aggregates, particulate filler material and additives, wherein the thermoplastic synthetic can be a polyamide mixture (e.g. aliphatic polyamide and impact modifiers), and the fibre-shaped aggregates can be high-strength glass fibres (e.g. S-1 and S-2 glass fibres from AGY). This document does not discuss the impact of specific combinations of glass fibres and impact modifiers to the ductility of the polyamides.

SUMMARY OF THE INVENTION

One objective of the present invention is to improve both the stiffness and impact strength of linear aliphatic polyamide compositions without significantly impairing their ductility.

This objective of the present invention is achieved by a polymer composition comprising:
a) 81 to 98 wt % of linear aliphatic polyamide having on average 10 to 14 carbon atoms in the monomer units,
b) 1 to 9 wt % of an S glass fibre comprising: 60 to 66 wt % $SiO_2$, 23 to 25 wt % $Al_2O_3$, 6 to 11 wt % MgO, 0 to 9 wt % CaO, 0 to 0.2 wt % $Na_2O+K_2O$, and 0 to 0.1 wt % $Fe_2O_3$, based on the total weight of the glass fibre, and
c) 1 to 10 wt % of a polyolefinic impact modifier which comprises the following monomer units:
  c1) 35 to 94.9 wt % of ethene-based monomer units,
  c2) 5 to 65 wt % of monomer units based on a 1-alkene with 3 to 8 carbon atoms,
  c3) 0 to 10 wt % of monomer units based on another olefin, and
  c4) 0.1 to 2.5 wt % of monomer units based on an aliphatically unsaturated dicarboxylic acid anhydride, based on the total weight of the polyolefinic copolymer impact modifier,
the wt % of a), b) and c) being based on the total weight of the polymer composition.

Another objective of the present invention is to provide moulding material consisting of the polymer composition of the present invention.

A further objective of the present invention is to provide moulded articles produced from the moulding material of the present invention.

DETAILED DESCRIPTION OF THE INVENTION

The linear aliphatic polyamide according to a) has on average 10 to 14 carbon atoms in the individual monomer units. Said polyamide is producible from a combination of diamine and dicarboxylic acid, from an ω-aminocarboxylic acid and/or the corresponding lactam. The monomer units in question are therefore the units which derive from lactam, ω-aminocarboxylic acid, diamine or dicarboxylic acid.

Suitable polyamides further include copolyamides which, on the basis of suitable comonomer selection, comply with the proviso that the monomer units comprise on average 10 to 14 carbon atoms, for example the copolyamide composed of laurolactam, decanediamine and dodecanedioic acid (co-PA12/1012).

It will be appreciated that the component according to a) employed may also be a mixture of two or more appropriate polyamides, sufficient mutual compatibility being advantageous.

Preferably, the linear aliphatic polyamide according to a) has on average from 10 to 12 carbon atoms in the individual monomer units. The following polyamides are suitable by way of example:
  Average of 10 carbon atoms: PA10, PA1010, PA812, PA128, PA614, PA146
  Average of 11 carbon atoms: PA11, PA1012, PA1210, PA913, PA139, PA814, PA148, PA616
  Average of 12 carbon atoms: PA12, PA1212, PA1113, PA1014, PA1410, PA816, PA618

Preferably, the S glass fibre comprises 64 to 66 wt % $SiO_2$, 24 to 25 wt % $Al_2O_3$, 9.5 to 10 wt % MgO, 0 to 0.2 wt % CaO, 0 to 0.2 wt % $Na_2O+K_2O$, and 0 to 0.1 wt % $Fe_2O_3$, based on the total weight of the glass.

More preferably, the S glass fibre does not comprise $B_2O_3$ and/or $TiO_2$. And particularly preferably, the S glass fibre does not comprise any further oxides.

In the polyolefinic impact modifier, the following compounds are possible as the 1-alkene with 3-8 carbon atoms: 1-propene, 1-butene, 1-pentene, 1-hexene, 1-heptene and 1-octene. Obviously, the monomer units based on a 1-alkene with 3-8 carbon atoms can also be derived from mixtures of these compounds.

The nature of the other olefin the monomer units whereof can be contained up to 0 to 10 wt % in the polyolefinic impact modifier is not restricted. It can for example be an unconjugated diene, a mono-ene such as 4-methylpentene-1 or styrene or a mixture thereof.

In a first embodiment, the other olefin the monomer units whereof can be contained in the polyolefinic impact modifier up to 0 to 10 wt % is not an unconjugated diene.

In a second embodiment, this other olefin is not styrene and/or not propene.

In a third embodiment, the polyolefinic impact modifier contains only monomer units which are derived from ethene, a 1-alkene with 3 to 8 carbon atoms and an aliphatically unsaturated dicarboxylic acid anhydride.

In a fourth embodiment, the 1-alkene with 3 to 8 carbon atoms is 1-propene.

In a fifth embodiment, the 1-alkene with 3 to 8 carbon atoms is 1-butene.

In a sixth embodiment, the 1-alkene with 3 to 8 carbon atoms is 1-hexene.

In a seventh embodiment, the 1-alkene with 3 to 8 carbon atoms is 1-octene.

These embodiments can be combined with one another without restriction.

The aliphatically unsaturated dicarboxylic acid anhydride can for example be maleic anhydride, however other similar compounds such as for example aconitic anhydride, citraconic anhydride or itaconic anhydride are also suitable.

The polyolefinic impact modifier can be produced in known manner, wherein the aliphatically unsaturated dicarboxylic acid anhydride or a precursor thereof, for example the corresponding acid or a half ester, is reacted with a preformed copolymer thermally or preferably by a radical reaction. Here the aliphatically unsaturated dicarboxylic acid anhydride can also be reacted in combination with other monomers, for example with dibutyl fumarate or styrene. The polyolefinic impact modifier is commercially available in various types, e.g. Exxelor VA1803, commercially available from Exxon Mobil.

The polyolefinic impact modifier is as a rule rubber-like, although it can also have a relatively high crystalline content. This is particularly to be seen with a higher content of monomer units which are derived from ethene, and with a not completely random distribution of the individual monomer units.

Preferably, the polyolefinic impact modifier comprises 40 to 90 wt % and particularly preferably 45 to 85 wt % of ethene-based monomer units.

Also preferably, the polyolefinic impact modifier comprises 10 to 60 wt % and particularly preferably 15 to 55 wt % of monomer units based on a 1-alkene with 3 to 8 carbon atoms.

The polymer composition according to the invention may comprise as constituents, in addition to the components according to a), b) and c), further customary added substances preferably chosen such that they impair transparency only to the smallest possible extent if at all, for example flame retardants, stabilizers, plasticizers, glass fibres, fillers, nanoparticles, antistats, dyes, pigments, mould-release agents or flow assistants, with an total amount not greater than 10 wt %, preferably not greater than 5 wt % based on the total weight of the polymer composition.

Preferably, the polymer composition according to the invention consists of the above specified constituents.

The polymer composition may be produced by melt mixing on suitable kneaders or compounding machines, discharging and comminution. A multiphase system is concerned here where the modifier is present in the polyamide matrix in finely disperse form. The melt mixing is effected according to the prior art in a kneading assembly, discharge generally in the form of a strand/extrudate and comminution generally by pelletizing, crushing or grinding.

The polymer composition is preferably a moulding composition and can be used as moulding material.

The moulding material can be processed into moulded articles by melting and moulding by processes known to those skilled in the art such as injection moulding, extrusion, pressing or rolling.

The moulded articles can be used in one of the following sectors: electrical equipment, sports items, optical equipment, sanitary and hygiene items, household equipment, communications technology, automobile technology, energy and drive technology, mechanical engineering, medical equipment.

The invention is elucidated by way of example hereinbelow.

Examples

The following materials were employed in the reference, the example (E1) and the comparative examples (CE1 and CE2):

Polyamide: VESTAMID LX9012, a PA12 moulding composition, commercially available from Evonik Resource Efficiency GmbH;

CS7974: E-glass fibre, commercially available from Lanxess;

ECS301HP: E-glass fibre, commercially available from CPIC;

AGY 544: a S-2 glass fibre with the following composition: 64 to 66 wt % $SiO_2$, 24 to 25 wt % $Al_2O_3$, 0 to 0.2 wt % CaO, 9.5 to 10 wt % MgO, 0 to 0.2 wt % $Na_2O+K_2O$ and 0 to 0.1 wt % $Fe_2O_3$, commercially available from AGY;

Exxelor VA1803: an impact modifier of a maleic anhydride-grafted ethylene/propylene rubber, commercially available from Exxon Mobil.

Melt mixtures were produced on a Coperion ZSK-26mc co-rotating twin screw extruder, discharged, pelletized to obtain the polymer compositions according to the recipe indicated in Table 1, wherein the polyamides and impact modifier were dry blended and fed into the main port of extruder and then mixed at 250° C., and the glass fibers were fed via a side feeder into the extruder.

The polymer compositions in pellet form were processed on an injection moulding machine Engel VC 650/200 (melt temperature 240° C.; mould temperature 60° C.) to prepare specimens for mechanical performance tests.

Tensile modulus of elasticity, tensile stress at yield, tensile stress at break and elongation at break were determined by Zwick Z020 materials testing system according to ISO 527, on ISO tensile specimens, type 1A, 170 mm×10 mm×4 mm at a temperature (23±2°)° C., relative humidity (50±10)%.

Notched impact strength was determined by CEAST Resil Impactor 6967.000, according to ISO 179/1eA (Charpy) on tensile specimens ISO 527 type 1A which were cut off two ends, 80 mm×10 mm×4 mm at a temperature (23±2°)° C., relative humidity (50±10)%.

Hardness (shore D) was determined by Time group shore D hardness tester TH210, according to ISO 868, on tensile specimens ISO 527 type 1A 170 mm×10 mm×4 mm at a temperature (23±2°)° C., relative humidity (50±10)%.

The overall results are shown in Table 1.

TABLE 1

| Recipe and performance | | | | |
|---|---|---|---|---|
| | Reference | E1 | CE1 | CE2 |
| Recipe | | | | |
| Polyamide | 100% | 91% | 91% | 91% |
| Lanxess CS7974 | — | — | 4% | — |
| CPIC ECS301HP | — | — | — | 4% |
| AGY 544 | — | 4% | — | — |
| Exxelor VA1803 | — | 5% | 5% | 5% |
| Performance | | | | |
| Tensile modulus (MPa) | 1100 | 1590 | 1480 | 1510 |
| Stress at yield (MPa) | 34 | 38.9 | 41.9 | 43.7 |

TABLE 1-continued

| Recipe and performance | | | | |
|---|---|---|---|---|
| | Reference | E1 | CE1 | CE2 |
| Stress at break (MPa) | 47 | 40.4 | 36.1 | 37.9 |
| Elongation at break (%) | 280 | 267 | 42.9 | 42.6 |
| Notched impact strength (kJ/m$^2$) | 11 | 23.6 | 26.7 | 26.1 |
| Hardness (Shore D) | 71 | 70.2 | 70.9 | 70.9 |

Compared to other combination of the glass fibres and the impact modifiers (CE1 and CE2), the polymer composition with S glass fibre and the polyolefinic impact modifier (E1) shows a much less impaired ductility which is embodied by the elongation at break.

The invention claimed is:

1. A polymer composition, comprising:
   a) 81 to 98 wt % of a linear aliphatic polyamide having on average 10 to 14 carbon atoms in monomer units,
   b) 1 to 9 wt % of an S glass fibre, comprising:
      60 to 66 wt % $SiO_2$,
      23 to 25 wt % $Al_2O_3$,
      6 to 11 wt % MgO,
      0 to 9 wt % CaO,
      0 to 0.2 wt % $Na_2O+K_2O$, and
      0 to 0.1 wt % $Fe_2O_3$, based on a total weight of the S glass fibre, and
   c) 1 to 10 wt % of a polyolefinic impact modifier which comprises:
      c1) 35 to 94.9 wt % of ethene-based monomer units,
      c2) 5 to 65 wt % of monomer units based on a 1-alkene with 3 to 8 carbon atoms,
      c3) 0 to 10 wt % of monomer units based on another olefin, and
      c4) 0.1 to 2.5 wt % of monomer units based on an aliphatically unsaturated dicarboxylic acid anhydride,
      based on a total weight of the polyolefinic impact modifier,
   wherein the wt % of a), b), and c) are based on a total weight of the polymer composition.

2. The polymer composition according to claim 1, wherein the linear aliphatic polyamide is selected from the group consisting of PA10, PA1010, PA812, PA128, PA614, PA146, PA11, PA1012, PA1210, PA913, PA139, PA814, PA148, PA616, PA12, PA1212, PA1113, PA1014, PA1410, PA816, PA618, and a mixture thereof.

3. The polymer composition according to claim 1, wherein the S glass fibre comprises:
   64 to 66 wt % $SiO_2$,
   24 to 25 wt % $Al_2O_3$,
   9.5 to 10 wt % MgO,
   0 to 0.2 wt % CaO,
   0 to 0.2 wt % $Na_2O+K_2O$, and
   0 to 0.1 wt % $Fe_2O_3$,
   based on the total weight of the S glass fibre.

4. The polymer composition according to claim 1, wherein the S glass fibre does not comprise $B_2O_3$ and/or $TiO_2$.

5. The polymer composition according to claim 1, wherein the polyolefinic impact modifier consisting of:
   monomer units which are derived from:
      ethene,
      a 1-alkene with 3 to 8 carbon atoms, and
      an aliphatically unsaturated dicarboxylic acid anhydride.

6. The polymer composition according to claim 1, wherein in the polyolefinic impact modifier c),
   the 1-alkene with 3 to 8 carbon atoms is selected from the group consisting of 1-propene, 1-butene, 1-pentene, 1-hexene, 1-heptene, 1-octene, and a mixture thereof, and/or
   the aliphatically unsaturated dicarboxylic acid anhydride is selected from the group consisting of maleic anhydride, aconitic anhydride, citraconic anhydride, and itaconic anhydride.

7. The polymer composition according to claim 1, wherein the polyolefinic impact modifier comprises:
   40 to 90 wt % of the ethene-based monomer units, and/or
   10 to 60 wt % of the monomer units based on the 1-alkene with 3 to 8 carbon atoms.

8. The polymer composition according to claim 7, wherein the polyolefinic impact modifier comprises:
   45 to 85 wt % of the ethene-based monomer units, and/or
   15 to 55 wt % of the monomer units based on the 1-alkene with 3 to 8 carbon atoms.

9. The polymer composition according to claim 1, further comprising:
   a customary added substance selected from the group consisting of flame retardants, stabilizers, plasticizers, glass fibres, fillers, nanoparticles, antistats, dyes, pigments, mould-release agents, and flow assistants with a total amount not greater than 10 wt % based on the total weight of the polymer composition.

10. The polymer composition according to claim 9, wherein the total amount of the customary added substance is no greater than 5 wt %, based on the total weight of the polymer composition.

11. The polymer composition according to claim 1, consisting of:
    a) 81 to 98 wt % of the linear aliphatic polyamide having on average 10 to 14 carbon atoms in the monomer units,
    b) 1 to 9 wt % of the S glass fibre, consisting of:
       60 to 66 wt % $SiO_2$,
       23 to 25 wt % $Al_2O_3$,
       6 to 11 wt % MgO,
       0 to 9 wt % CaO,
       0 to 0.2 wt % $Na_2O+K_2O$, and
       0 to 0.1 wt % $Fe_2O_3$, based on the total weight of the S glass fibre, and
    c) 1 to 10 wt % of the polyolefinic impact modifier, consisting of:
       c1) 35 to 94.9 wt % of the ethene-based monomer units,
       c2) 5 to 65 wt % of the monomer units based on the 1-alkene with 3 to 8 carbon atoms,
       c3) 0 to 10 wt % of the monomer units based on the another olefin, and
       c4) 0.1 to 2.5 wt % of the monomer units based on the aliphatically unsaturated dicarboxylic acid anhydride,
       based on the total weight of the polyolefinic impact modifier,
    wherein the wt % of a), b) and c) are based on the total weight of the polymer composition.

12. A moulding material, consisting of:
    the polymer composition according to claim 1.

13. A moulded article produced from the moulding material according to claim 12.

14. The moulded article according to claim 13, wherein the moulded article is selected from the group consisting of electrical equipment, sports items, optical equipment, sanitary and hygiene items, household equipment, an article for communications technology, an article for automobile technology, an article for energy and drive technology, an article for mechanical engineering, and medical equipment.

15. The polymer composition according to claim 1, wherein the S glass fibre does not comprise any further oxides.

* * * * *